Aug. 12, 1941.  A. KRATKY  2,252,129
PROCESS FOR THE PRODUCTION OF HARD BODIES, ESPECIALLY
OF CUTTING, DRAWING, AND SIMILAR TOOLS
Filed June 13, 1939  2 Sheets-Sheet 2
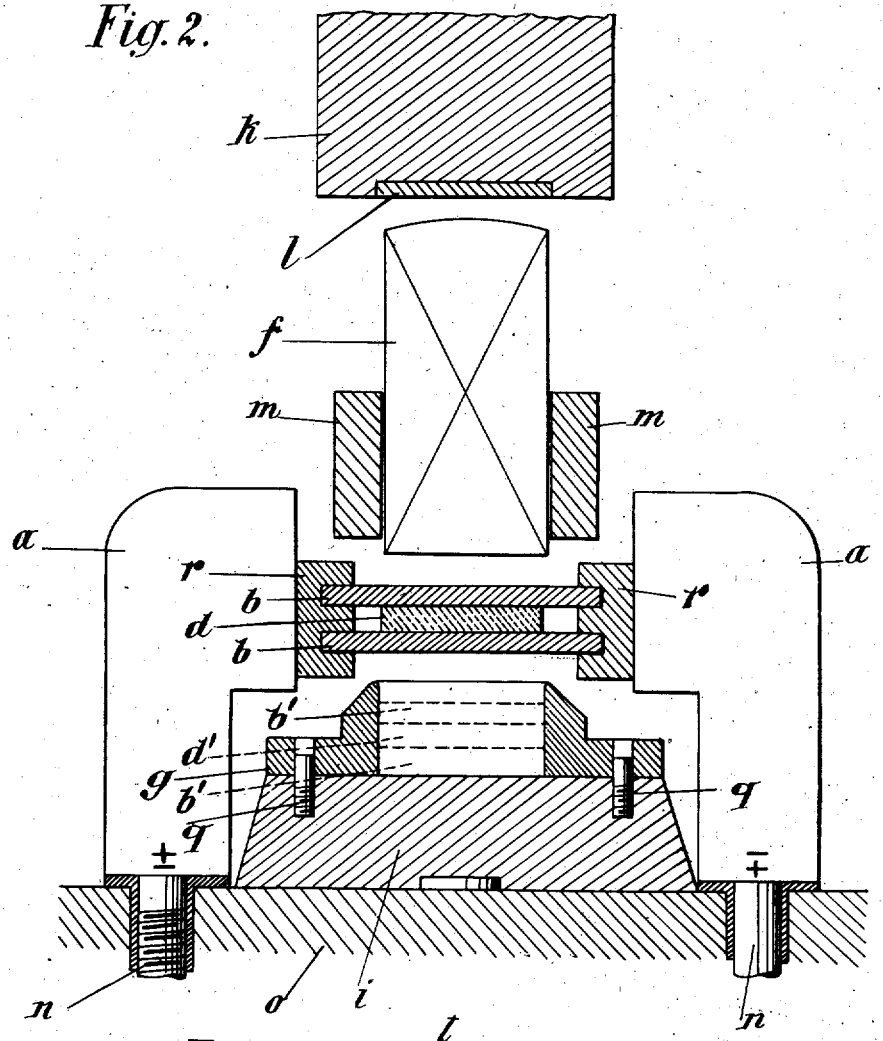

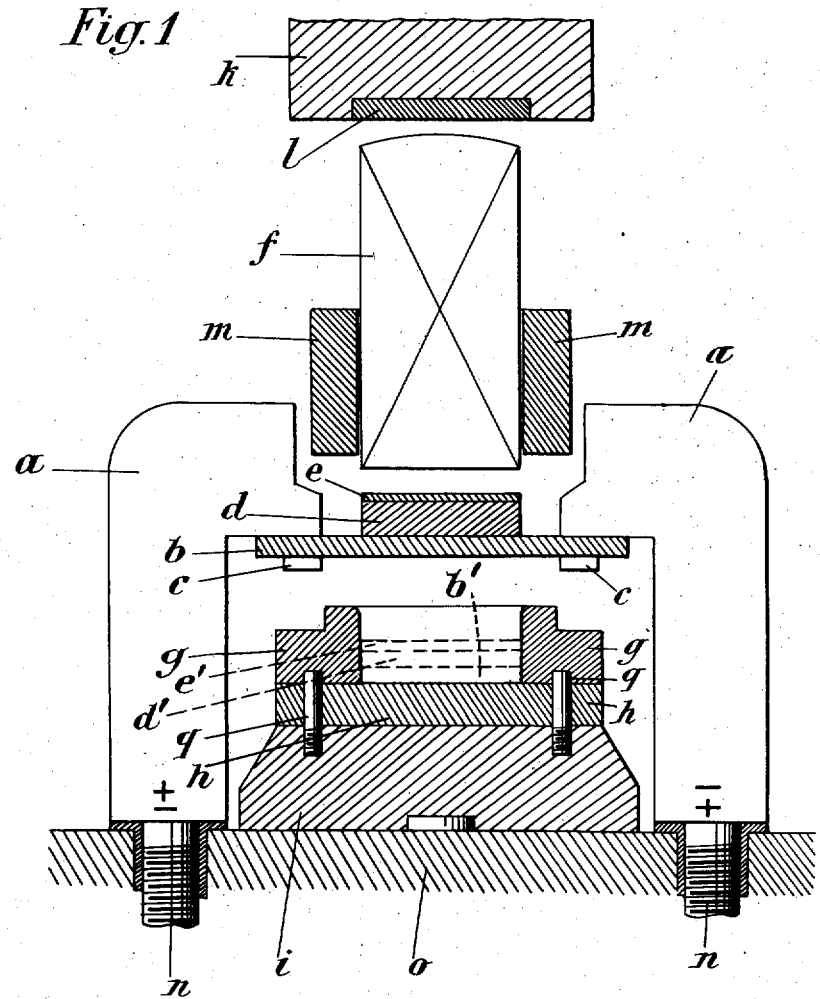

Patented Aug. 12, 1941

2,252,129

UNITED STATES PATENT OFFICE 2,252,129

PROCESS FOR THE PRODUCTION OF HARD BODIES, ESPECIALLY OF CUTTING, DRAWING, AND SIMILAR TOOLS

Anton Kratky, Vienna, Germany, assignor to Forged Carbides Incorporated, New York, N. Y., a corporation of Delaware Application June 13, 1939, Serial No. 278,911

7 Claims. (Cl. 75—22)

This invention relates to a process for the production of hard bodies from hard carbides, hard nitrides and the like or from mixtures of such hard substances, with or without admixed metals, if desired with hardening admixtures, for example with admixture of diamond powder, boron, silicon carbide or the like, which are preliminarily shaped under pressure in pulverized state and subsequently compressed by forging in a matrix while protected by one or two heated plates with application of heavy pressure and strong heat.

The object of the invention is to produce especially drawing, cutting and similar tools.

According to the invention a blank is pressed from the pulverized prime material, that is from the hard material; this blank is then preliminarily heated, if necessary, at a moderate temperature and is clamped as a pressed body or already after preliminary heating, between a die and a matrix opposite thereto so that it touches neither the die nor the matrix. The pressed body rests on a heated support and is driven, together with this support, into the matrix and forged by a blow on the die. Before being heated the pressed body is preferably covered with a thin heat-insulating layer or plate so as to prevent its being cooled too rapidly by the metal die or matrix. If the support is made of carbon, the pressed body may also lie on a thin intermediate layer of magnesia, tin oxide or the like so as to prevent the surface carburization of the pressed body during the heating process.

The method according to the invention possesses the following advantages over the forging process for the production of hard bodies described in my Patent No. 2,089,030. As the heated pressed body rests on a heated support and is pressed into the matrix along with the support by a blow on the die, rapid cooling of the pressed body does not take place, with the result that crack formation is avoided. The layer over the pressed body serves the same purpose. A suitable support for the pressed body is a plate of graphite, carbon or tungsten or of an electricity conducting metal, or of a metal alloy or of a metal oxide through which electric current is passed for the purpose of heating. Thus, the support with the pressed body resting thereon can easily be brought to the desired forging temperature. It is evident, however, that the support with the pressed body can be heated to the desired forging temperature in some other manner for example by a blower.

Two apparatus for carrying out the invention are illustrated by way of example in the accompanying drawings, in which:

Fig. 1 shows a diagrammatic sectional view of a press for forging the pressed body.

Fig. 2 is a similar view of a modification;

Fig. 3 is a sectional view showing the forged body surrounded by a protecting shield which is to be removed subsequently; and Fig. 4 is a plan view of the body shown in Fig. 3.

In Fig. 1 a striker tool $f$ of metal is guided between guides $m$. $a$ designates two electrodes against which a support $b$ of graphite or the like is held by means of arms $c$ which may resiliently press the support $b$ upward against the electrode $a$. $d$ designates the pressed body, $e$ a heat insulating plate, $g$ and $h$ the mating parts of a steel matrix, $i$ a support for the matrix and $q$ screws by which the matrix is secured to the support $i$.

The electrodes $a$ supply electric current to the support $b$ which is thus heated together with the pressed body $d$. The die $f$ is then driven downwards, as by the falling weight or hammer $k$ provided with a hard striking plate $l$, with the result that the support $b$ is driven on to the matrix $g$ and then sheared off against the upper edges of the matrix. As the die $f$ continues to descend, the pressed body $d$ and the plate $e$ are driven or forged into the positions $d'$ and $e'$ and at the same time the sheared off piece $b'$ of the support is formed into the matrix between $d'$ and $h$.

In the apparatus illustrated in Fig. 2, the die is designated by $f$, the die guides by $m$, the electrodes by $a$, the matrix by $g$, the matrix support by $i$, electrode holders by $r$, and two graphite plates by $b$ between which the pressed body $d$ is placed. These plates $b$ are heated by the electric current supplied by the electrodes $a$, with the result that the pressed body $d$ is brought to the required forging temperature. As the die $f$ is struck downwards, the plates $b$ are depressed, sheared off by the matrix and then assume the position $b'$, $b'$ within the matrix along with the pressed body $d'$ which by this operation is forged.

Preliminarily and finally shaped pressed bodies can also be forged with the apparatus shown in Fig. 1, if they are first provided with a coating of magnesia, alumina, quartz powder or the like. Figs. 3 and 4 show such a pressed body $i$ surrounded by a shell $k$ of magnesia or the like.

The secondary position of the forged body and the lamellae in Figs. 1 and 2 is shown on dotted lines.

The process according to the invention can be carried out both in a vacuum and in a protective atmosphere, or alternately in a vacuum and in a protective atmosphere.

Hard substances in the sense of this invention are hard carbides, hard nitrides and the like, mixtures of these substances, also hard carbides or hard nitrides or mixtures of such substances which may be mixed with metals or metal alloys and which either alone or mixed with metals also contain hardening additions such as diamond powder, boron, silicon carbide or the like.

I claim:

1. The process of producing hard bodies from finely powdered refractory material, which comprises, pressing the material to form a body, placing the pressed body between upper and lower carbon lamellae above a matrix, passing electric current through the carbon lamellae to heat the pressed body to a forging temperature, and driving the heated pressed body and the surrounding heated carbon lamellae by a hammer die into the matrix to forge the pressed body, the hot heat insulating carbon lamellae serving to protect the body during cooling in the matrix.

2. The process of producing hard bodies from a finely powdered refractory material, which comprises, pressing the material to form a body, placing the pressed body between upper and lower carbon lamellae above a matrix, passing electric current through the lower carbon lamella to heat the pressed body supported thereon to a forging temperature, and driving the heated pressed body and the surrounding heated carbon lamellae by a hammer die into the matrix to forge the pressed body, the hot heat insulating carbon lamellae serving to protect the body during cooling in the matrix.

3. The process of producing hard bodies from a finely powdered refractory material, which comprises, pressing the material to form a body, placing the pressed body between upper and lower carbon lamellae above a matrix, placing a layer of carburization preventing material between the pressed body and the carbon lamellae, passing electric current through the lower carbon lamella to heat the pressed body supported thereon to a forging temperature, and driving the heated pressed body and the surrounding heated carbon lamellae by a hammer die into the matrix to forge the pressed body, the hot heat insulating carbon lamellae serving to protect the body during cooling in the matrix.

4. The process of producing hard bodies from a finely powdered refractory material, which comprises, pressing the material to form a body, placing the pressed body between upper and lower carbon lamellae above a matrix, the carbon lamellae being larger than the matrix opening, placing a layer of carburization preventing material between the pressed body and the carbon lamellae, passing electric current through the carbon lamellae to heat the pressed body to a forging temperature, and driving the heated pressed body and the surrounding heated carbon lamellae by a hammer die into the matrix to forge the pressed body, the carbon lamellae being sheared off against the upper edge of the matrix, the hot heat insulating carbon lamellae serving to protect the body during cooling in the matrix.

5. The process of producing hard bodies from a finely powdered refractory material, which comprises, pressing the material to form a body, placing heat insulating material about the pressed body and supporting the body through the insulating material between electrodes above a matrix, heating the pressed body by electrical current which passes through the electrodes and the supporting insulating material to a forging temperature and at the same time heating the surrounding material, and driving the heated pressed body and the surrounding hot heat insulating material into the matrix to forge the pressed body, the heat insulating material serving to protect the body during cooling in the matrix.

6. The process of producing hard bodies from a pre-shaped refractory material, which comprises, pressing and pre-heating the material to form a coherent shaped body, supporting the body above a matrix upon a heat insulating lamella disposed between electrodes, placing a refractory protective lamella above the body, heating the body through the electrodes and the supporting lamella to a forging temperature, and driving the heated body and the surrounding lamellae into the matrix to forge the body, the lamellae serving to protect the body during cooling in the matrix.

7. The process of producing hard bodies from pre-shaped refractory material, which comprises, pressing and pre-heating the material to form a coherent shaped body, supporting the body above a matrix upon a frangible heat insulating lamella disposed between electrodes, the supporting lamella being larger than the matrix opening, placing a heat insulating lamella above the body, heating the body through the electrodes and the supporting lamella to a forging temperature, and driving the heated body and covering portions of the lamellae into the matrix to forge the body, part of the supporting lamella being sheared off by this action, and the hot heat insulating lamellae protecting the forged body against too sudden cooling in the matrix.

ANTON KRATKY.